(12) United States Patent
Foley

(10) Patent No.: US 7,726,528 B2
(45) Date of Patent: *Jun. 1, 2010

(54) BICYCLE CARRIER

(75) Inventor: Aaron J. Foley, Portland, OR (US)

(73) Assignee: Yakima Products, Inc., Beverton, OR (US)

( * ) Notice: Subject to any disclaimer, the term of this patent is extended or adjusted under 35 U.S.C. 154(b) by 932 days.

This patent is subject to a terminal disclaimer.

(21) Appl. No.: 11/502,604

(22) Filed: Aug. 9, 2006

(65) Prior Publication Data

US 2007/0119887 A1 May 31, 2007

Related U.S. Application Data

(60) Provisional application No. 60/707,193, filed on Aug. 9, 2005.

(51) Int. Cl.
*B60R 9/00* (2006.01)
*B60R 9/052* (2006.01)

(52) U.S. Cl. .................. 224/324; 315/322; 315/315

(58) Field of Classification Search ............ 224/324, 224/924, 315, 322; 211/20, 17; 403/320, 403/315
See application file for complete search history.

(56) References Cited

U.S. PATENT DOCUMENTS

| | | |
|---|---|---|
| 357,287 A | 2/1887 | Nolte |
| 376,055 A | 1/1888 | Hopkins |
| 2,271,452 A | 1/1942 | Carroll |
| 2,576,222 A | 11/1951 | Dean |
| 3,239,115 A | 3/1966 | Bott |
| 3,258,820 A | 7/1966 | Steinberg |
| 3,292,222 A | 12/1966 | Steinberg |
| 3,662,435 A | 5/1972 | Allsop |
| 3,668,791 A | 6/1972 | Salzman |
| 3,828,993 A | 8/1974 | Carter |
| 3,843,001 A * | 10/1974 | Willis .................. 414/462 |

(Continued)

FOREIGN PATENT DOCUMENTS

DE  3034750  4/1982

(Continued)

OTHER PUBLICATIONS

535xt Classic Fork Mount Instructions, Thule U.S.A., undated.

*Primary Examiner*—Nathan J Newhouse
*Assistant Examiner*—Lester L Vanterpool
(74) *Attorney, Agent, or Firm*—Kolisch Hartwell, P.C.

(57) ABSTRACT

A bicycle carrier, including a rack and a fork mount. The rack includes cross bars for mounting on a vehicle. The fork mount includes a head portion adapted to selectively clamp the fork mount to one of the cross bars, and a skewer assembly adapted to selectively secure forks of a bicycle to the head portion. The skewer assembly includes a skewer bolt, an actuator handle that is moveable between a first position and a second position, and an adjustment member threaded onto an end of the skewer bolt that permits longitudinal adjustment of the skewer assembly to accommodate different fork dimensions. The adjustment member is accessible when the actuator handle is in the first position, but is covered by the actuator handle when the actuator handle is in the second position.

25 Claims, 5 Drawing Sheets

U.S. PATENT DOCUMENTS

| | | |
|---|---|---|
| 3,848,784 A | 11/1974 | Shimano |
| 3,893,568 A | 7/1975 | Lile |
| 3,900,923 A | 8/1975 | Thomas |
| 3,906,593 A | 9/1975 | Caveney |
| 3,912,139 A | 10/1975 | Bowman |
| 3,922,018 A | 11/1975 | Shook |
| 4,021,888 A | 5/1977 | Aimar |
| 4,028,915 A | 6/1977 | Stahl |
| 4,057,182 A | 11/1977 | Kolkhorst |
| 4,057,183 A | 11/1977 | Ness |
| 4,112,557 A | 9/1978 | Salomon |
| 4,114,409 A | 9/1978 | Scire |
| 4,193,171 A | 3/1980 | Lichowsky |
| 4,274,569 A | 6/1981 | Winter et al. |
| 4,310,951 A | 1/1982 | Riedel |
| 4,326,320 A | 4/1982 | Riedel |
| 4,386,709 A | 6/1983 | Graber |
| 4,400,038 A | 8/1983 | Hosokawa |
| 4,424,636 A | 1/1984 | Everest |
| 4,433,786 A | 2/1984 | Wahl |
| 4,442,961 A | 4/1984 | Bott |
| 4,453,290 A | 6/1984 | Riedel |
| 4,501,354 A | 2/1985 | Hoffman |
| 4,547,980 A | 10/1985 | Olivieri |
| 4,553,292 A | 11/1985 | Pradier |
| 4,555,830 A | 12/1985 | Petrini |
| 4,596,080 A | 6/1986 | Benoit |
| 4,614,047 A | 9/1986 | Arieh |
| 4,619,122 A | 10/1986 | Simpson |
| 4,621,873 A | 11/1986 | Weinstein |
| 4,624,063 A | 11/1986 | Delery |
| 4,629,104 A | 12/1986 | Jacquet |
| 4,646,401 A | 3/1987 | Morell |
| 4,670,946 A | 6/1987 | Olivieri |
| 4,683,620 A | 8/1987 | Valsecchi |
| 4,724,692 A | 2/1988 | Turin |
| 4,727,630 A | 3/1988 | Alan |
| 4,759,137 A | 7/1988 | Lederer |
| 4,761,859 A | 8/1988 | Calabrigo |
| 4,763,957 A | 8/1988 | Poehlmann |
| 4,770,011 A | 9/1988 | Constant |
| 4,789,206 A | 12/1988 | Ozaki |
| 4,796,337 A | 1/1989 | Marxer |
| 4,842,148 A | 6/1989 | Bowman |
| 4,887,754 A | 12/1989 | Boyer |
| 4,912,817 A | 4/1990 | Sandreid |
| 4,934,572 A | 6/1990 | Bowman |
| 4,951,487 A | 8/1990 | Sheils Dennis |
| 4,964,287 A | 10/1990 | Gaul |
| 5,003,711 A | 4/1991 | Nerrinck |
| 5,005,390 A | 4/1991 | Giannini |
| 5,007,260 A | 4/1991 | Sharp |
| 5,022,672 A | 6/1991 | Kawai |
| 5,027,628 A | 7/1991 | De Rocher |
| 5,037,019 A | 8/1991 | Sokn |
| 5,042,705 A | 8/1991 | Johansson |
| 5,052,605 A | 10/1991 | Johansson |
| 5,065,921 A | 11/1991 | Mobley |
| 5,083,350 A | 1/1992 | Sandreid |
| 5,118,125 A | 6/1992 | Plunkett |
| 5,135,330 A | 8/1992 | Chen |
| 5,165,762 A | 11/1992 | Phillips |
| 5,169,044 A | 12/1992 | Englander |
| 5,172,454 A | 12/1992 | Martignago |
| 5,193,254 A | 3/1993 | Geisinger |
| 5,203,484 A | 4/1993 | Englander |
| 5,226,341 A | 7/1993 | Shores |
| 5,232,134 A | 8/1993 | Allen |
| 5,275,319 A | 1/1994 | Ruana |
| 5,288,001 A | 2/1994 | Locarno |
| 5,291,763 A | 3/1994 | Cuisinot |
| 5,316,192 A | 5/1994 | Ng |
| 5,357,690 A | 10/1994 | Ho |
| 5,362,173 A | 11/1994 | Ng |
| 5,377,886 A | 1/1995 | Sickler |
| 5,416,952 A | 5/1995 | Dodge |
| 5,419,479 A | 5/1995 | Evels |
| 5,426,826 A | 6/1995 | Takimoto |
| 5,492,258 A | 2/1996 | Brunner |
| 5,511,894 A * | 4/1996 | Ng .............................. 403/320 |
| 5,526,555 A | 6/1996 | Battistella |
| 5,570,825 A | 11/1996 | Cona |
| 5,573,165 A | 11/1996 | Bloemer |
| 5,598,959 A * | 2/1997 | Lorensen et al. ............ 224/315 |
| 5,624,063 A | 4/1997 | Ireland |
| 5,690,259 A | 11/1997 | Montani |
| 5,692,659 A | 12/1997 | Reeves |
| 5,709,521 A | 1/1998 | Glass |
| 5,730,343 A | 3/1998 | Settelmayer |
| 5,738,258 A | 4/1998 | Farrow |
| 5,745,959 A | 5/1998 | Dodge |
| 5,752,298 A | 5/1998 | Howell |
| 5,762,248 A | 6/1998 | Englander |
| 5,775,555 A | 7/1998 | Bloemer |
| 5,820,002 A | 10/1998 | Allen |
| 5,833,074 A | 11/1998 | Phillips |
| 5,862,964 A | 1/1999 | Moliner |
| 5,875,947 A | 3/1999 | Noel |
| 5,924,614 A | 7/1999 | Kuntze |
| 5,988,402 A | 11/1999 | Mayfield |
| 6,062,450 A | 5/2000 | Noel |
| 6,167,735 B1 | 1/2001 | Brown |
| 6,425,509 B1 | 7/2002 | Dean |
| 6,494,351 B1 * | 12/2002 | Dean ......................... 224/324 |
| 6,601,712 B2 * | 8/2003 | Dean et al. .................... 211/20 |
| 6,758,380 B1 * | 7/2004 | Kolda ........................ 224/315 |
| 6,851,590 B2 | 2/2005 | Dean |
| 6,938,782 B2 | 9/2005 | Dean |
| 2002/0026816 A1 | 3/2002 | Katsouros |

FOREIGN PATENT DOCUMENTS

| | | |
|---|---|---|
| DE | 4208064 | 5/1993 |
| EP | 0161441 | 11/1985 |
| EP | 0220784 | 5/1987 |
| EP | 0224288 | 6/1987 |
| FR | 2221329 | 10/1974 |
| FR | 2251187 | 11/1974 |
| FR | 2332155 | 6/1977 |
| FR | 2420454 | 10/1979 |
| FR | 2428545 | 1/1980 |
| IT | 1189908 | 2/1988 |
| IT | 1236808 | 4/1993 |

* cited by examiner

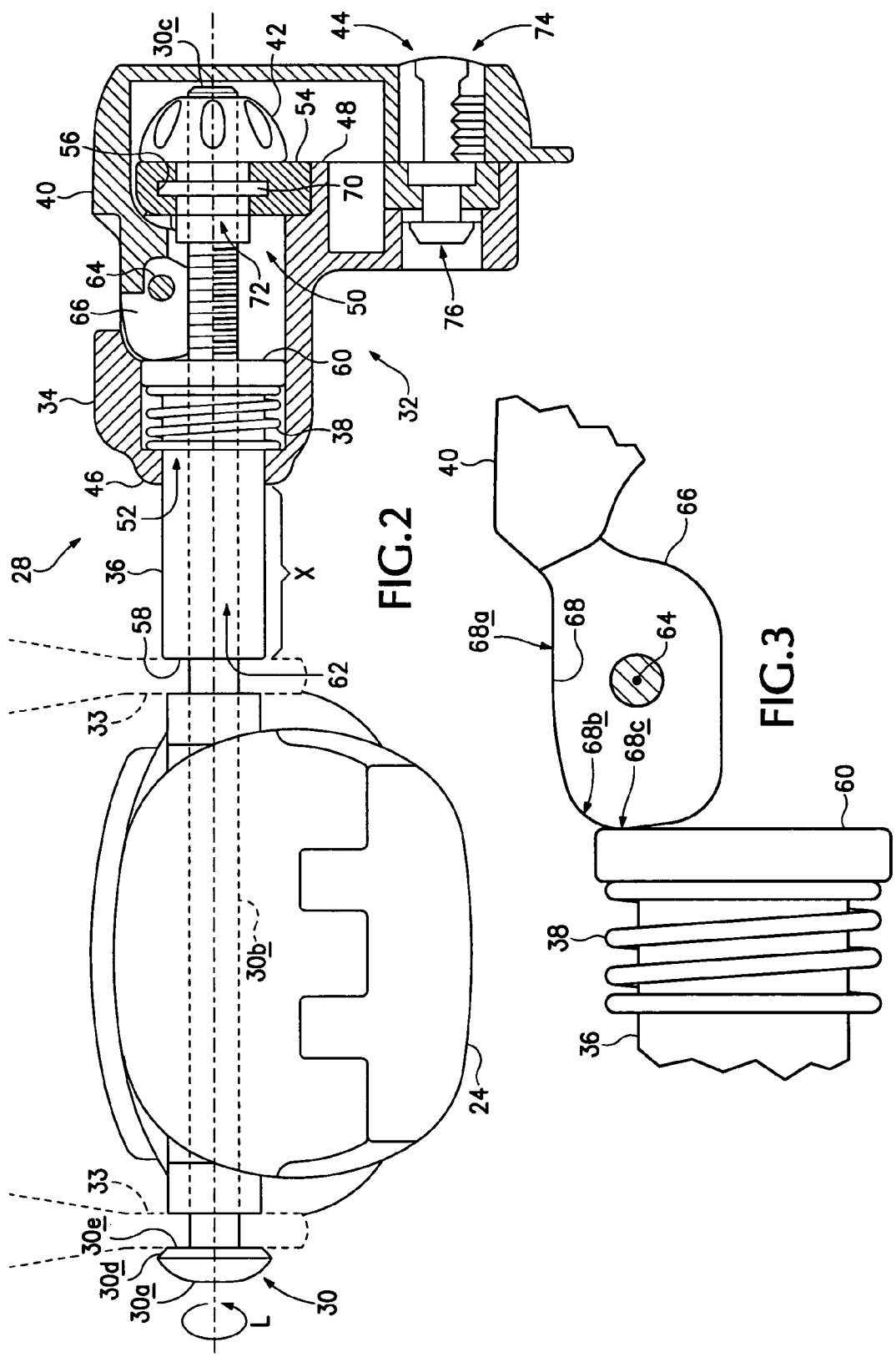

BICYCLE CARRIER

CROSS-REFERENCE TO RELATED APPLICATION

The present application claims priority from U.S. Provisional Patent Application Ser. No. 60/707,193, filed Aug. 9, 2005, incorporated herein by reference in its entirety for all purposes.

BACKGROUND

Bicycles are often transported on vehicles. Numerous racks and devices have been devised to secure bicycles to vehicles during transport. One particularly common bicycle carrier utilizes a fork mount mounted to a rack structure. The fork mount has a skewer assembly that clamps the front forks of a bicycle to secure the bicycle to the rack. Typically, fork mount-type carriers include a wheel tray that extends back from the fork mount to support the rear wheel. A securing member may be positioned along the wheel tray that includes a strap configured to secure the rear wheel to the wheel tray. Typically, these straps must be pulled tightly around the rear wheel to hold it securely during normal driving speeds and conditions.

Examples of fork mount-type bicycle carriers, and various types of securing mechanisms are found in U.S. Pat. Nos. 6,748,630; 6,684,667; 6,601,712; 6,561,398; 6,494,351; 6,460,708; 6,431,423; 6,425,509; 6,283,310; 5,749,694; 5,745,959; 5,738,258; 5,598,959; 5,479,836; 5,416,952; 5,265,897; 4,842,148; 3,848,784; 3,828,993, the disclosures of which are hereby incorporated by reference in their entirety for all purposes.

BRIEF DESCRIPTION OF THE FIGURES

FIG. 2 is a front partial cross-sectional view of a bicycle carrier with an actuator handle in the closed position.

FIG. 3 is a front view of an actuator handle in the closed position engaging a clamping member.

DETAILED DESCRIPTION

Figure 1:
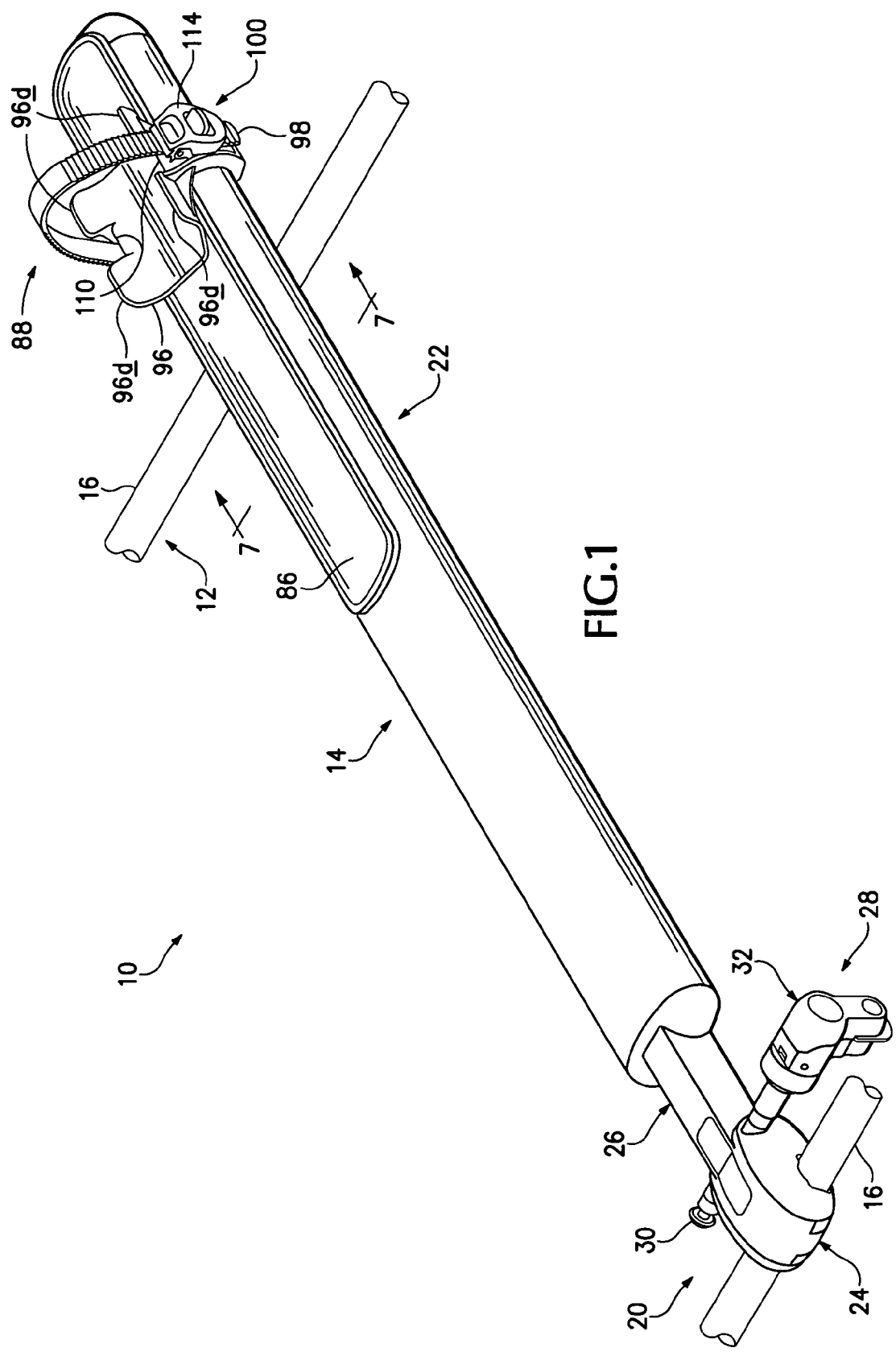
FIG. 1 is a perspective view of a bicycle carrier constructed according to the present invention.

FIG. 1 shows a bicycle rack 10 for a vehicle. The bicycle rack may include a roof rack 12 adapted to be selectively mounted on a vehicle, and a bicycle carrier 14 adapted to be selectively attached to the roof rack. Roof rack 12 may include crossbars 16, which extend across the roof and are typically either round or rectangular in cross section. The crossbars may be mounted to the vehicle in any manner known to those skilled in the art. The bicycle carrier 14 may include a fork mount 20, and a wheel support 22. The fork mount 20 may be adapted: (1) to selectively attach the bicycle carrier 14 to a crossbar 16, and (2) to selectively secure the forks of a bicycle to the bicycle carrier. The wheel support 22 may be adapted to selectively receive and secure the rear wheel of a bicycle.

A. The Fork Mount

As indicated above, the fork mount 20 may include any device adapted: (1) to selectively attach the bicycle carrier 14 to a crossbar 16, and (2) to selectively secure the forks of a bicycle to the bicycle carrier. The fork mount may be constructed of any materials consistent with its function. The fork mount may include a head portion 24, an extension portion 26, and a skewer assembly 28.

Head portion 24 may include any mechanism for selectively attaching the bicycle carrier 14 to the roof rack 12, and for providing a surface against which a bicycle fork is retained. For example, the head portion may include a clamping mechanism for selectively attaching the bicycle carrier to, or removing the bicycle carrier from the crossbar 16. The head portion may include a lower jaw pivotally connected to a fixed upper jaw by a hinge pin, similar to the head portions disclosed in either U.S. Pat. No. 6,494,351 (the '351 patent) or U.S. Pat. No. 5,598,959 (the '959 patent), which are hereby incorporated by reference in their entirety for all purposes. As disclosed in the '351 and '959 patents, the head portion may be coupled to a skewer assembly 28 for clamping the forks of a bicycle to the head portion. The skewer assembly of the present disclosure (shown in FIGS. 2-5) is discussed in more detail below.

Extension portion 26 may include a generally elongate portion that extends back from head portion 24, and attaches to wheel support 22. The extension portion may include a region between the head portion and wheel support with a narrow width to provide increased clearance for disc brakes when the fork of a bicycle having front disc brakes is attached to the bicycle carrier.

Skewer assembly 28, which may also be referred to as a clamping assembly, may include any mechanism for selectively securing forks of a bicycle to the head portion 24. The skewer assembly 28 may include a skewer bolt 30 for supporting the fork of a bicycle, and an actuator assembly 32 for selectively applying a clamping force that retains the fork of a bicycle against the head potion 24.

Referring to FIGS. 2-5, the skewer bolt 30 is adapted to selectively support the tines 33 of a bicycle's fork. The skewer bolt may be an elongate bolt having a longitudinal axis L, and including a first end 30a, a middle portion 30b, and a second end 30c. The first end 30a may include a bolt head 30d with an inner surface 30e for selectively engaging the outer surface of one of the tines 33 of the fork, as shown in FIG. 2. The middle portion 30b may be adapted to fit through an aperture in the head portion 24, as disclosed in either the '351 or the '959 patent. As shown in FIG. 2, the middle portion 30b may have segments that allow a user to mount the tines of a bicycle's fork 33 onto the skewer bolt 30. The middle portion 30b may also be adapted to engage portions of the actuator assembly 32, as described below. The second end 30c may be threaded so as to enable a user to removably attach the skewer bolt 30 to the actuator assembly 32, and to adjust the actuator assembly's position relative to the longitudinal axis L of the skewer bolt, also as described below.

Figure 4:
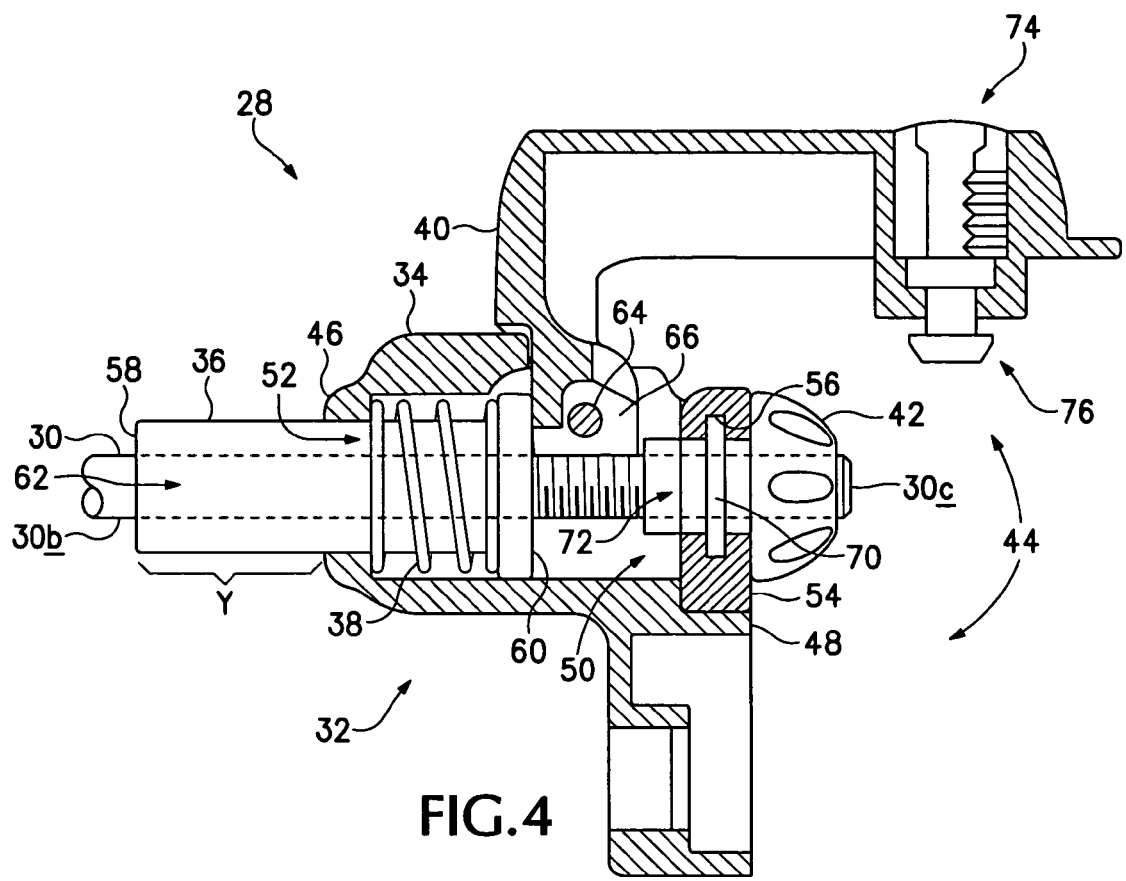
FIG. 4 is a front partial cross-sectional view of a bicycle carrier with an actuator handle in the open position.

The actuator assembly 32 is adapted to selectively apply a clamping force that retains the fork of a bicycle against the head portion 24. The actuator assembly may include a housing 34, a clamping member 36, a biasing mechanism 38, an actuator handle 40, an adjustment member 42, and a locking device 44. FIGS. 2 and 4 show the housing 34 and actuator handle 40 in cross-section, so as to show the other components of the actuator assembly 32.

The housing 34 may include a first end 46, and a second end 48, and may define a cavity 50. The first end 46 may include an aperture 52 leading into the cavity and having a width that is smaller than the width of the cavity 50. The second end 48 may include an adjustment member support 54 adapted to rotatably retain the adjustment member 36 in a translationally fixed position relative to the housing 34. For example, the support 54 may include a slot 56 that is engaged by a projecting portion 70 of the adjustment member 36, as described below. The cavity 50 may have a longitudinal axis, directed between the housing's first and second ends, that is substantially co-linear with the longitudinal axis L of the skewer bolt 30.

The clamping member 36 may be movable relative to the housing 34. The clamping member 36, which may also be described as a bullet or a cam follower, may include a first end 58, and a second end 60. The first end 58 may have a size and shape corresponding to the size and shape of the aperture 52. The second end 60 may have a size and shape corresponding to the size and shape of the cavity 50. The clamping member 36 may be positioned within the housing 34 such that the first end 58 extends through the aperture 52, while the larger size of the second end 60 prevents the second end from passing through the aperture. The clamping member 36 may thereby be partially seated and retained within the cavity 52, and may be movable between a first clamped position (shown in FIG. 2) and a second unclamped position (shown in FIG. 4). The clamping member's first end 58 may extend a distance X from the housing 34 when the clamping member is in the clamped position, and a distance Y from the housing when the clamping member is in the unclamped position, where distance X is longer than distance Y.

The clamping member 36 may also be movable relative to the skewer bolt 30. The clamping member may include an aperture 62 passing between the first end 58 and the second end 60, and having a size and shape corresponding to the size and shape of the skewer bolt's middle portion 30*b*. When the skewer assembly 28 is fully assembled, the skewer bolt's middle portion 30*b* passes through the clamping member's aperture 62. The longitudinal axis of the aperture 62 is therefore substantially co-linear with the longitudinal axis L of the skewer bolt. As discussed below, the skewer bolt's second end 30*c* is coupled to the housing 34 by the adjustment member 42, and the adjustment member can be used to adjust the position of the housing 34 relative to the skewer bolt's longitudinal axis L. Once the housing's position relative to longitudinal axis L has been adjusted, the adjustment member 42 functions to fix the position of the housing 34 relative to the skewer bolt 30. Because the clamping member 36 is movable relative to the housing 34, and the housing is fixed relative to the skewer bolt 30, the clamping member is movable relative to the skewer bolt. Specifically, moving the clamping member 36 from the clamped position (FIG. 2) to the unclamped position (FIG. 4) causes the clamping member, which is mounted on the skewer bolt 30, to slidably reciprocate along the skewer bolt.

Finally, the clamping member 36 may be movable relative to the head portion 24. When the skewer assembly is fully assembled, the skewer bolt's middle portion 30*b* passes through the head portion 24. The position of the skewer bolt 30 relative to the head portion does not change substantially during use. Because the clamping member 36 is movable relative to the skewer bolt 30, and because the skewer bolt is substantially fixed relative to the head portion 24, the clamping member is therefore movable relative to the head portion. Specifically, moving the clamping member 36 from the unclamped position (FIG. 4) to the clamped position (FIG. 2) causes the clamping member's first end 58 to move towards the head portion, thereby clamping the tines of a bicycle fork 33 mounted on the skewer bolt 30 against the head portion 24. In contrast, moving the clamping member 36 from the clamped position (FIG. 2) to the unclamped position (FIG. 4) causes the clamping member's first end 58 to move away from the head portion 24, thereby unclamping the tines of the bicycle fork 33.

Biasing mechanism 38 may be adapted to urge the clamping member 36 towards the unclamped position. Biasing mechanism 38 may include any type of biasing mechanism for urging an object from one position to another position. For example, the biasing mechanism may include a compression spring positioned within cavity 50 between the housing's first end 46 and the clamping member's second end 60, thereby urging the clamping member towards the housing's second end 48. As described below, the actuator handle 40 includes a portion that extends into the cavity and engages the clamping member's second end 60, thus preventing the biasing mechanism 38 from moving the clamping member 36 any closer to the housing's second end 48 than the position of the actuator handle.

The actuator handle 40 may be adapted to selectively move the clamping member 36 between the clamped position and the unclamped position within the cavity 50. As shown in FIGS. 2-5, the actuator handle 40, which may also be described as a cam lever, may be pivotally attached to the housing 34 by a pivot pin 64, and may include one or more cam lobes 66. The actuator handle may be pivotally moveable about the pivot pin 64 between a first unclamping position (shown in FIGS. 4 and 5) and a second clamping position (shown in FIGS. 2 and 3). The cam lobes 66 may extend into the cavity 50 in a position adjacent to the skewer bolt, whereby the cam lobes engage the clamping member's second end 60. Because the biasing mechanism 38 urges the clamping member 36 towards the housing's second end 48, the clamping member is moved by the biasing mechanism into engagement with the actuator handle's cam lobes 66. The cam lobes 66 may have an arcuate shape that causes the actuator handle 40 to move the clamping member 36 from the unclamped position to the clamped position as the actuator handle is moved from the first unclamping position (FIGS. 4-5) to the second clamping position (FIGS. 2-3). In contrast, as the actuator handle is moved from the clamping position (FIGS. 2-3) to the unclamping position (FIGS. 4-5), the biasing mechanism 40 urges the clamping member 36 to follows the arcuate shape of the cam lobes 66, thus moving from the clamped position to the unclamped position.

In some or all embodiments, the cam lobes 66 may have an over-center shape that causes the distance that the clamping member's first end 58 extends out of the housing 34 to first increase, to reach a maximum, and to then slightly decrease as the actuator handle is moved from the unclamping position to the clamping position. As indicated above, each cam lobe 66 may have an arcuate shape that causes the distance between the pivot point 64, and the point at which the cam lobe's surface 68 makes contact with the clamping member's second end 60, to change as the actuator handle 40 is moved from the unclamping position (FIG. 5) to the clamping position (FIG. 3). For example, when the actuator handle 40 is in the unclamping position (FIG. 5), cam surface 68 may make contact with second end 60 at contact point 68a. As the actuator handle is moved from the unclamping position towards the clamping position (FIG. 3), the distance between the pivot point 64 and the contact point between the surface 68 and second end 60 may increase until the cam surface makes contact with the second end at contact point 68b. At this point, the actuator handle is positioned in an over-center position (not shown), thereby causing the clamping member's first end 58 to extend a maximal distance outside of the housing 34. After the actuator handle is moved past the over-center position (not shown) towards the clamping position (FIG. 3), the distance between the pivot point 64 and the contact point between the surface 68 and the second end 60 may decrease until the cam surface makes contact with the second end at contact point 68c. Therefore, in some embodiments, the distance that the clamping member's first end 58 extends from the housing 34 may decrease as the actuator handle is moved from an over-center position towards either the clamping or the unclamping position.

Figure 5:
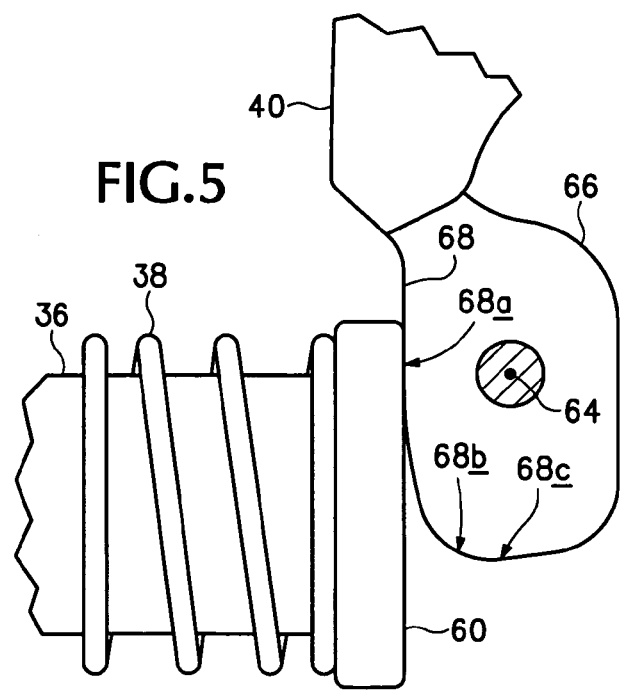
FIG. 5 is a front view of an actuator handle in the open position engaging a clamping member.
Figure 6:
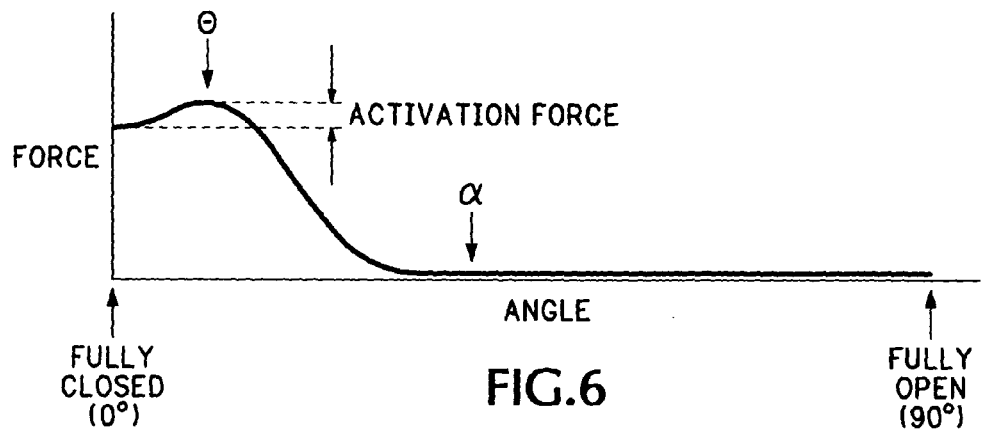
FIG. 6 is a diagram showing the relative clamping force applied by a clamping member to the forks of a bicycle as a function of an actuator handle's angle relative to the clamping member.

In embodiments where the cam lobe has an over-center shape, the amount of force applied by the clamping member 36 to a bicycle's fork may decrease as the actuator handle is moved from an over-center position towards either the clamping or the unclamping position. FIG. 6 generally shows a force diagram representing the amount of force applied by a clamping member 36 to a bicycle fork mounted on the skewer bolt 30, as a function of the angle between the actuator handle 40 and the longitudinal axis L of the of the skewer bolt 30. When the actuator handle 40 is in the unclamping position (i.e. when the actuator handle forms a 90 degree angle relative to the longitudinal axis L, as shown in FIGS. 4-5), the clamping member 36 generally is not engaged with the bicycle forks, and therefore does not exert a force against the forks. As the actuator handle 40 is moved towards the clamping position, the clamping member's first end 58 gradually extends outwardly from the housing until the first end eventually engages the tine 33 of a bicycle fork. This occurs when the actuator handle is positioned at some angle α relative to the longitudinal axis L, as shown in FIG. 6. After the clamping member's first end 58 has engaged the tine 33 of a bicycle fork, the force applied to the fork increases up to a maximal force when the clamping member's first end 58 is extending a maximal distance from the housing 34. As discussed above, this occurs when the actuator handle has been moved to the over-center position (i.e. when the actuator handle is positioned at some angle θ relative to the longitudinal axis L, and the cam surface 68 makes contact with the clamping member's second end 60 at contact point 68b). For example, the angle θ of an actuator handle 40 in the over-center position may range from 5-30 degrees relative to the longitudinal axis L, such as 5, 10, 15, 20, 25, or 30 degrees. As the actuator handle 40 is moved from the over-center position towards the clamping position (i.e. when the actuator handle is moved to an angle that is less than angle θ relative to the longitudinal axis L), the force applied by the clamping member's first end may decrease slightly, because the distance that the clamping member's first end 58 extends from the housing 34 also decreases. Therefore, in some embodiments, the amount of force applied by the clamping member 36 to a bicycle's fork may decrease as the actuator handle is moved from an over-center position towards either the clamping position or the unclamping position. In these embodiments, the clamping force applied by the clamping member 36 to the bicycle's fork when the clamping member is in the clamping position (i.e. when the actuator handle forms a 0 degree angle relative to the longitudinal axis L, as shown in FIG. 3) must still be of sufficient magnitude to ensure that a bicycle is sufficiently secured to the bicycle carrier under any driving conditions.

In embodiments where the cam lobes 66 have an over-center shape, the difference in force applied by the clamping member 36 in the clamping position relative to the over-center position may provide positive feedback for the user, and may prevent the actuator assembly from accidentally releasing during transportation of a bicycle. Any force applied by the clamping member 36 to a bicycle fork is equally applied by the clamping member to the actuator handle 40. However, when the actuator handle 40 is in the over-center position, the moment of force about the actuator handle's pivot point is zero. In other words, the force applied by the clamping member 36 to the actuator handle 40 passes directly through the pivot point 64, and thus no torque is applied to the actuator handle that could cause the actuator handle to independently rotate about the pivot point 64. However, slightly moving the actuator handle 40 from the over-center position towards either the clamping or unclamping positions may create a moment of force about the actuator handle's pivot point, thus urging the actuator handle towards either the clamping or unclamping position, respectively. For example, moving the actuator handle from the over-center position towards the clamping position may create a moment of force that causes the actuator handle to independently move the remaining distance towards the clamping position, thus snapping into position. This snapping action may provide feedback to a user that the actuator handle has fully moved into the clamping position. Further, a user must apply an additional activation force to an actuator handle 40 that is positioned in the clamping position in order to move the actuator handle through the over-center position and into the unclamping position. This activation force may prevent the actuator assembly 32 from accidentally releasing during transportation of a bicycle.

The adjustment member 42 may be adapted to couple the housing 34 to the skewer bolt 30. The adjustment member 42, which may also be described as a knob or dial, may include a projecting portion 70 and a threaded aperture 72. The projecting portion 70 may be adapted to engage the slot 56 of the support 54, so as to retain the adjustment member 36 in a translationally fixed position relative to the housing 34. The adjustment member's translationally fixed position may be distal from the head portion 24 in relation to the clamping member 36, and the longitudinal axis of the threaded aperture 72 may be oriented so that it is substantially co-linear with the longitudinal axis L of the skewer bolt 30. The projecting portion 70 may also engage the slot 56 in a manner that enables free rotation of the adjustment member about the longitudinal axis L. The threaded aperture 72 may thus be engaged with the skewer bolt's threaded end 30c, and the adjustment member 42 may thereby be threaded onto the skewer bolt 30, which couples the skewer bolt to the housing 34. In other words, the adjustment member 42 may cap the end of the skewer bolt 30 at a position distal from the head portion 24.

The maximum force applied by the clamping member 36 to the bicycle's fork 33 may be adjusted. Specifically, the adjustment member 42 may be rotatably threaded onto or unthreaded from the skewer, so as to adjust the position of the housing 34 relative to the longitudinal axis L of the skewer bolt 30. The adjustment member 42 may thus be used to ensure that the skewer assembly 28 applies sufficient clamping force to the bicycle's fork 33 when the actuator handle 40 is pivoted from the unclamping to the clamping position, thereby making the skewer assembly useful for securing forks of different sizes to the head portion 24. In other words, the adjustment member 42 permits longitudinal adjustment of the skewer assembly 28 (i.e. adjustment of the position of the actuator assembly's housing 34 relative to the longitudinal axis L of the skewer bolt 30), which allows the skewer assembly to accommodate various bicycle forks having different dimensions. The adjustment member 42 may include a textured surface that enables a user to grip the knob when adjusting the amount of pressure. Further, by turning the adjustment member 42 until it completely unthreads from the skewer bolt 30, it may be possible to remove the actuator assembly 32 from the skewer bolt. This may in turn allow a user to remove the skewer bolt 30 from the head portion 24, and to reverse the skewer assembly 28 relative to the head portion.

The actuator assembly 32 may be adapted to prohibit access to the adjustment knob 42 when the actuator handle 40 is in the clamping position. As shown in FIG. 4, when the actuator handle 40 is in the open position, a user may access and rotate the adjustment member 42 as described above. As shown in FIG. 2, however, when the actuator handle 40 is in the closed position, the adjustment member 42 may be covered by the actuator handle, thereby preventing a user from accessing and rotating the adjustment member. This is significant because it prevents a third party from decreasing the force applied by the clamping member 36 to the bicycle's fork 33 simply by unscrewing the adjustment member 42.

The locking device 44 may be adapted to selectively secure the actuator handle 40 in the clamping position. Locks are well known in the art, and any type of locking mechanism may be used. For example, as shown in FIG. 2, the locking mechanism 44 may include a keying mechanism 46 and a bolt mechanism 48, each of which is well known to those skilled in the art.

In some or all embodiments, portions of the skewer assembly 28 may be adapted to prevent the skewer bolt 30 from being rotated relative to the adjustment knob 42 without a user actually turning the adjustment knob. For example, the skewer bolt 30 may include one or more relatively non-circular, or flatted portions corresponding to the portions of the skewer bolt 30 passing through the clamping member's aperture 62 and/or passing adjacent to the cam lobes 66. Likewise the clamping member's aperture 62 and the cam lobes 66 may have non-circular shapes corresponding to the shape of the non-circular portions of the skewer. These non-circular portions may be configured such that if any portion of the skewer assembly 28 is rotated about the longitudinal axis L, then every portion of the skewer assembly must also be rotated about the longitudinal axis. Specifically, rotating the skewer bolt 30 may cause the non-circular portions of the skewer bolt 30 to engage the non-circular portions of the clamping member 36 and the cam lobes 64, thus also rotating the clamping member 36 and the actuator handle 40. Because the clamping member 36 and the actuator handle 40 either engage with, or are in fixed positions relative to the housing 34, rotating the skewer bolt 30 also rotates the housing. Finally, because the adjustment member 42 couples the skewer bolt 30 to the housing 34, rotating the skewer bolt and housing at the same time will not induce rotation of the adjustment member relative to the skewer bolt. Therefore, providing a skewer bolt 30 with non-circular portions that correspond to non-circular portions on the clamping member's aperture 62 and the cam lobes 66, prevents the skewer bolt from being rotated relative to the adjustment knob 42 without a user actually turning the adjustment knob. This provides an additional anti-theft feature, in that a thief would be prevented from decreasing the clamping force applied to a bicycle's fork by the skewer assembly 28 simply by using pliers to turn the skewer bolt's first end 30a and unscrew the skewer bolt's second end 30c from the adjustment knob's threaded aperture 72.

B. The Wheel Support

The wheel support 22 may include any device adapted to receive and secure the rear wheel of a bicycle. The wheel support may be constructed of any materials consistent with its function. As shown in FIGS. 1, and 7-9, the wheel support 22 may include a central track 80, one or more laterally spaced tracks 82, an attachment member 84, an elongate wheel tray 86, and/or a securing mechanism 88.

Figure 7:
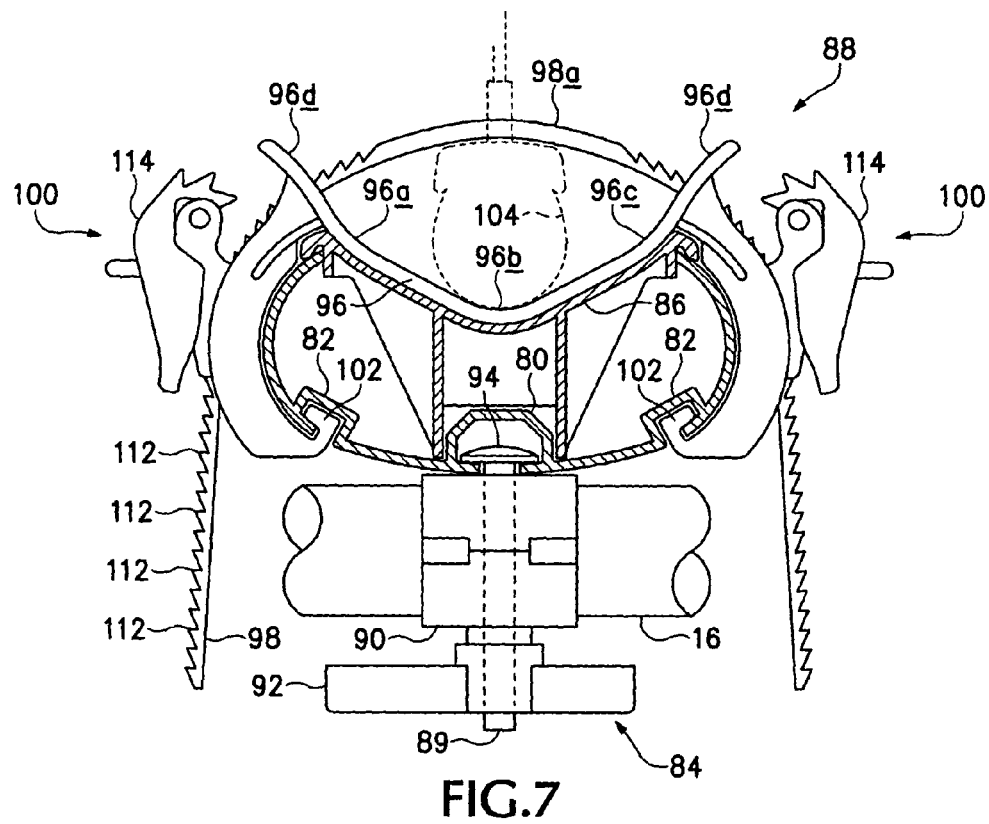
FIG. 7 is a front cross-sectional view of a securing mechanism securing a road bicycle's rear wheel to a wheel tray.
Figure 8:
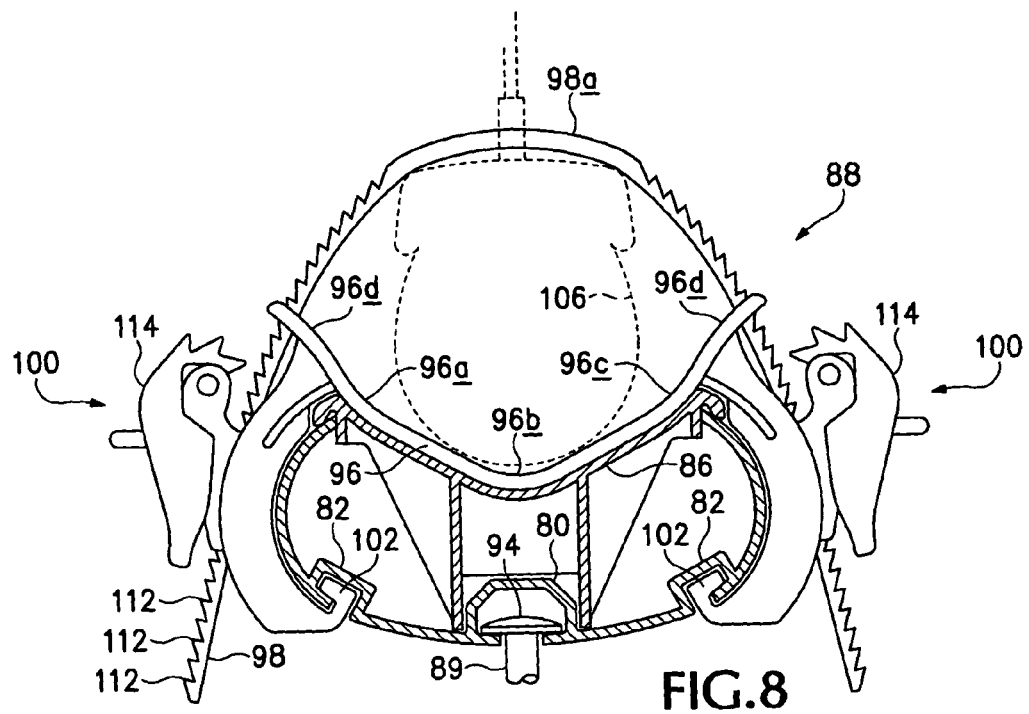
FIG. 8 is a front cross-sectional view of a securing mechanism securing a mountain bicycle's rear wheel to a wheel tray.
Figure 9:
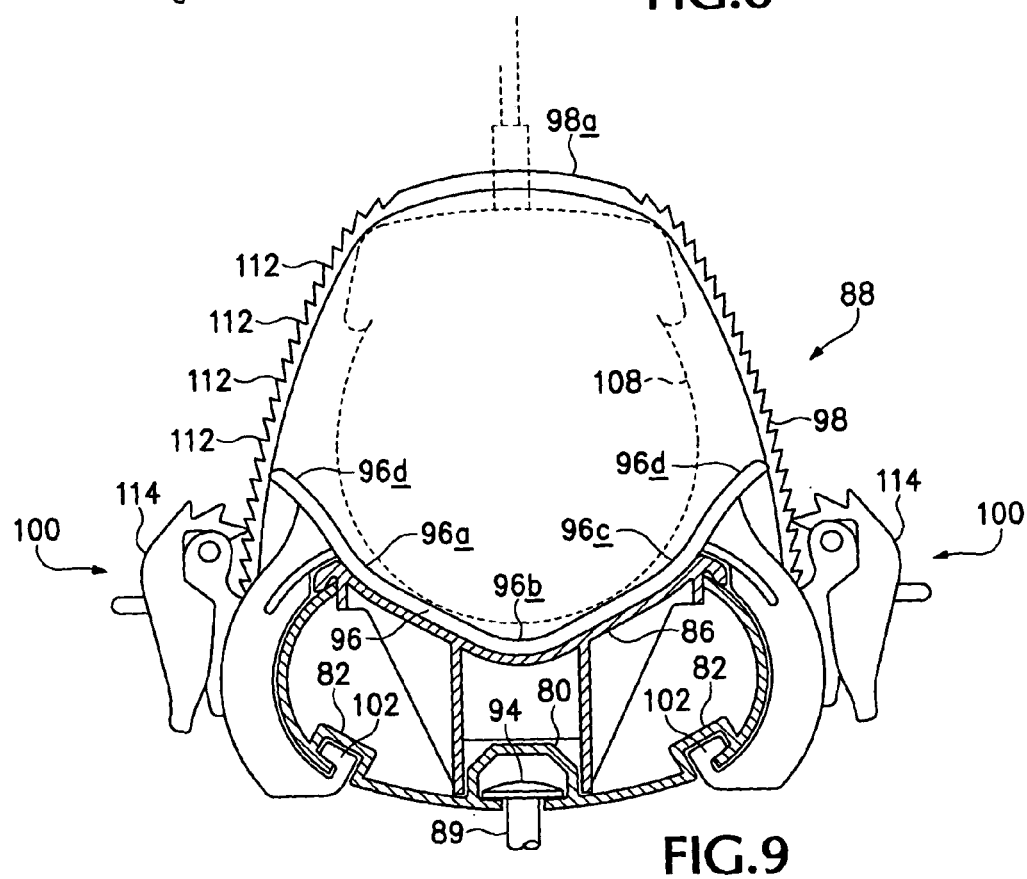
FIG. 9 is a front cross-sectional view of a securing mechanism securing a beach-cruiser bicycle's rear wheel to a wheel tray.

As shown in FIGS. 7-9, central track 80 may be positioned on the bottom and in the central portion of the bicycle carrier 14, and may extend parallel to the bicycle carrier's longitudinal axis along a substantial portion of the bicycle carrier's length. Similarly, the one or more laterally spaced tracks 82 may be positioned on the bottom of the bicycle carrier 14, may be laterally spaced relative to the center track 80, and may extend parallel to the bicycle carrier's longitudinal axis along a substantial portion of the bicycle carrier's length. The tracks may provide means for slidably attaching other components of the wheel support 22 to the bicycle carrier 14, as described below.

As shown in FIG. 7, the attachment member 84 may include any mechanism for removably attaching the wheel support portion of the bicycle carrier 14 to a crossbar 16. The attachment member may be positioned on the underside of the bicycle carrier 14, and may include a threaded bolt 89, a clamping member 90, and a securing device 92. The threaded bolt 89 may include a bolt head 94 dimensioned to slidably engage the central track 80, so as to enable a user to adjust the position of the attachment member 84 relative to the length of the bicycle carrier 14. The clamping member 90 may include any device that engages the threaded bolt 89, and that clamps about a crossbar 16. The securing device 92 may include any device for threadably engaging the threaded bolt 89. The securing device 92 may be fully tightened upwards against the clamping device 90, thus securing the clamping device about the crossbar 16, and the bolt head 94 in a fixed position relative to the central track 86.

The wheel tray 86 may include any mechanism adapted to selectively support a rear wheel of a bicycle. For example, as shown in FIGS. 1, and 7-9, the wheel tray may be concave, and may provide a space along which securing mechanism 88 may be translationally adjusted. A user may thereby position the securing mechanism 88 closer or further from the fork mount 20, thereby enabling a user to selectively secure the rear wheels of different bicycles having varied wheelbases.

The securing mechanism 88 may include any mechanism adapted to selectively secure the rear wheel of a bicycle to the wheel tray 86. As shown in FIGS. 7-9, the securing mechanism 88 may include a receiver 96, a strap 98, one or more adjustment mechanisms 100, and one or more engagement members 102.

The receiver 96 (also referred to as a housing, or a "taco") may include any mechanism for receiving and retaining bicycle wheels of various shapes and sizes. The receiver 96 may have laterally extending side walls shaped in a manner that defines one or more concave portions, such as concave portions 96a-c, and one or more convex portions, such as ear portions 96d, for receiving and retaining bicycle tires having different diameters. For example, FIG. 7 shows the receiver 96 engaged with a road bike's tire 104, FIG. 8 shows the receiver engaged with a mountain bike's tire 106, and FIG. 9 shows the receiver engaged with a beach cruiser's tire 108. The side walls of the receiver 96 may also include one or more notches 110 (shown in FIG. 1), positioned to receive a portion of the strap 98 for securing the rear wheel, as discussed below. The notches 110 may be configured to allow a user to draw the strap closer to the bottom of the receiver 96 than would be possible without the notches due to the receiver's extended ear portions 96d. The notches thereby may allow a user to engage and secure bicycle wheels of various shapes and sizes without the need for some form of adapter.

The strap 98 may include any mechanism for securing the rear wheel of a bicycle to the receiver 96, and may include a securing portion 98a that extends across a portion of the bicycle's rear wheel. The strap may be formed integrally with or separately from the receiver 96. The strap may be configured to slidably engage the one or more adjustment mechanisms 100, and may be positioned for reception by the one or more notches 110. The strap may include one or more teeth, such as teeth 112, which extend laterally across the strap.

The adjustment mechanism 100 may include any mechanism for tightening and loosening the strap around the rear wheels of a bicycle. For example, the adjustment mechanism may be positioned adjacent to the lateral side walls of the receiver 96 for selectively adjusting the length of the strap's securing portion 96a. The adjustment mechanism may include a buckle, such as those disclosed in U.S. Pat. No. 6,561,398 and/or U.S. Pat. No. 6,283,310, the disclosures of which are herein incorporated by reference in their entirety for all purposes. The adjustment mechanism may also include any type of buckle having a ratcheting assembly for selectively engaging the strap's teeth 112, such as buckles made by Everest or Burton for use in snowboard bindings.

The one or more engagement members 102 may be configured to slidably engage the one or more laterally spaced tracks 82, thereby enabling a user to adjust the position of the securing mechanism 88 along the wheel tray's longitudinal axis.

The various structural members disclosed herein may be constructed from any suitable material, or combination of materials, such metal, plastic, nylon, plastic, rubber, or any other materials with sufficient structural strength to withstand the loads incurred during use. Materials may be selected based on their durability, flexibility, weight, and/or aesthetic qualities.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to every one of the disclosed inventions. Similarly, where the claims recite "a" or "a first" element or the equivalent thereof, such claims should be understood to include incorporation of one or more such elements, neither requiring nor excluding two or more such elements.

I claim:

1. A bicycle carrier, comprising
    a rack including cross bars for mounting on a vehicle; and
    a fork mount including a head portion adapted to selectively clamp the fork mount to one of the cross bars, and a clamping assembly adapted to selectively secure forks of a bicycle to the head portion, the clamping assembly having a bolt, an actuator handle that pivots around a pivot axis between a first position and a second position, a skewer assembly having a center portion, and an adjustment member threaded onto an end of the bolt that permits longitudinal adjustment of the clamping assembly to accommodate different fork dimensions, the pivot axis of the actuator handle being located between the center portion of the skewer assembly and the adjustment member, the adjustment member being accessible when the actuator handle is in the first position, wherein the actuator handle closes over the adjustment member as it pivots into the second position, thereby blocking access to the adjustment member.

2. The bicycle carrier of claim 1, wherein the end of the bolt extends from the head portion, and the adjustment member is a knob that caps the end of the bolt such that no other structure is capped onto the end of the bolt at a position that is further from the head portion than the adjustment knob.

3. The bicycle carrier of claim 1, wherein the clamping assembly further includes a clamping member slidably mounted on the bolt between the fork mount and the adjustment member, and moveable between a clamped position and an unclamped position.

4. The bicycle carrier of claim 3, wherein the clamping assembly further includes a biasing mechanism that urges the clamping member towards the unclamped position, and wherein moving the actuator handle from the first position to the second position causes the actuator handle to move the clamping member from the unclamped position to the clamped position.

5. The bicycle carrier of claim 3, wherein the clamping member includes a cam follower, and the actuator handle includes a cam lever pivotally mounted on the clamping assembly and operable upon rotation to reciprocally shift the cam follower on the bolt.

6. The bicycle carrier of claim 1, wherein the clamping assembly further includes a lock device that selectively secures the actuator handle in the second position.

7. The bicycle carrier of claim 1, wherein the fork mount is selectively removable from the crossbar.

8. The bicycle carrier of claim 1, wherein the head portion includes a first jaw member pivotally connected to a second jaw member at a hinge point, the jaws defining an opening therebetween configured to receive the cross bar.

9. The bicycle carrier of claim 1, wherein the head portion is connected to a wheel support by an elongate extension portion.

10. The bicycle carrier of claim 9, wherein the extension portion, has a narrowed width portion to provide clearance for disc brake components.

11. The bicycle carrier of claim 9, wherein the wheel support includes an elongate wheel tray adapted to selectively support a rear wheel of the bicycle, and a securing mechanism adapted to selectively secure the rear wheel to the wheel tray, wherein the securing mechanism includes:
    a receiver positioned within the wheel tray, and having lateral side walls shaped for receiving bicycle wheels of various shapes and sizes;
    a strap attached to the receiver and having a securing portion that extends across a portion of the rear wheel; and
    one or more adjustment mechanisms positioned adjacent to the lateral side walls for adjusting the length of the strap's securing portion.

12. The bicycle carrier of claim 11, wherein the lateral side walls include one or more notches adapted to receive the securing portion of the strap in a manner that enables a user to engage bicycle wheels of various shapes and sizes with the securing portion.

13. The bicycle carrier of claim 11, wherein the position of the securing mechanism is adjustable along the wheel tray's longitudinal axis.

14. The bicycle carrier of claim 11, wherein each of the one or more adjustment mechanisms include a ratchet assembly for selectively engaging a toothed portion of the strap.

15. A bicycle carrier, comprising
a rack including cross bars for mounting on a vehicle, and a fork mount including a head portion adapted to selectively clamp the fork mount to one of the cross bars, and a skewer assembly adapted to selectively secure forks of a bicycle to the head portion, the skewer assembly having: a skewer passing through the head portion, with a first end disposed on a first side of the head portion, and a second threaded end disposed on a second side of the head portion, the skewer having a center portion between the first end and the second threaded end; an actuator handle that pivots around a first axis between the first position and the second; a clamping member slidably mounted on the skewer bolt, and movable between a clamped position and an unclamped position, wherein moving the actuator handle from the first position to the second position causes the clamping member to move from the unclamped position to the clamped position; and an adjustment member that permits longitudinal adjustment of the skewer assembly to accommodate different fork dimensions, the adjustment member being accessible when the actuator handle is in the first position, wherein the actuator handle closes over the adjustment member as it pivots into the second position, thereby blocking access to the adjustment member when the actuator handle is in the second position, and wherein the first pivot axis of the actuator handle is located between the center portion of the skewer and the adjustment member.

16. The bicycle carrier of claim 15, wherein the clamping member is mounted on the skewer bolt between the fork mount and the adjustment member.

17. The bicycle carrier of claim 15, wherein the skewer assembly further includes a biasing mechanism that urges the clamping member towards the unclamped position.

18. The bicycle carrier of claim 15, wherein the clamping member includes a cam follower, and the actuator handle includes a cam lever pivotally mounted on the skewer assembly and operable upon rotation to reciprocally shift the cam follower on the skewer.

19. The bicycle carrier of claim 15, wherein the skewer assembly further includes a lock device that selectively secures the actuator handle in the clamped position.

20. The bicycle carrier of claim 15, wherein the fork mount is selectively removable from the crossbar.

21. The bicycle carrier of claim 15, wherein the head portion includes a first jaw member pivotally connected to a second jaw member at a hinge point, the jaws defining an opening therebetween configured to receive the cross bar.

22. The bicycle carrier of claim 15, wherein the head portion is connected to a wheel support by an elongate extension portion.

23. The bicycle carrier of claim 22, wherein the extension portion has a narrowed width portion to provide clearance for disc brake components.

24. A bicycle carrier, comprising
a rack including cross bars for mounting on a vehicle roof;
a fork mount including a head portion adapted to selectively clamp the fork mount to one of the cross bars, and a skewer assembly adapted to selectively secure forks of a bicycle to the head portion, the skewer assembly including a skewer bolt having a proximal end, a distal end, and a center portion, proximal and distal being defined relative to a side on which a user would manipulate the fork mount, a handle selectively moveable around a pivot axis between a clamping position and an unclamping position to clamp and unclamp a bicycle fork, the pivot axis being substantially perpendicular to the long axis of the skewer bolt, an adjustment member configured to adjust an effective length of the skewer bolt to accommodate different fork dimensions, the pivot axis being located between the center portion of the skewer bolt and the adjustment member, and a wheel tray connected to the fork mount for supporting a rear wheel of a bicycle, wherein the actuator handle closes over the adjustment member as it pivots into the second position, thereby blocking access to the adjustment member.

25. The bicycle carrier of claim 24, wherein the handle includes a cam lever.

* * * * *